Nov. 20, 1934.  K. RATHKE  1,981,195
DEVICE FOR THE INDICATION OF ALTERNATING PRESSURES
Filed July 31, 1931
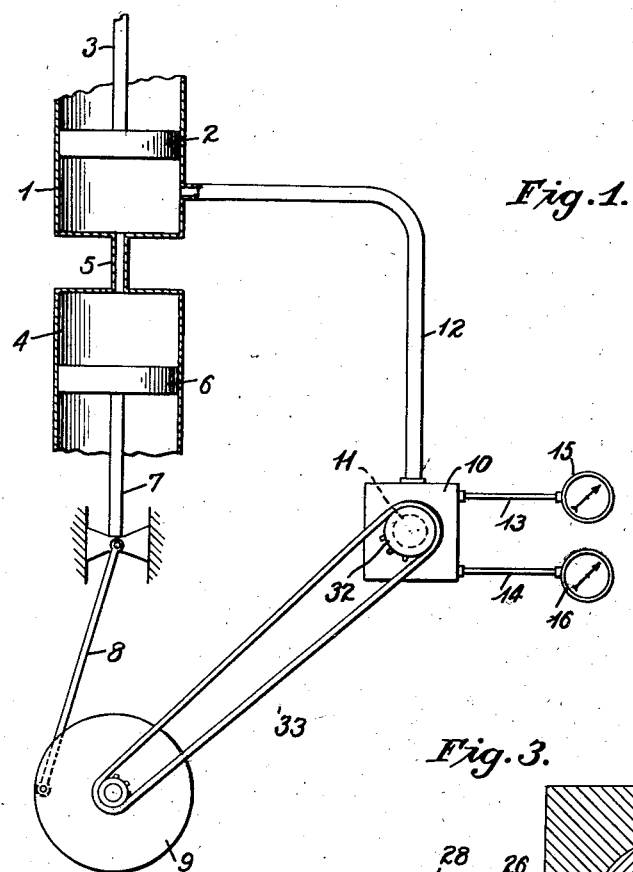
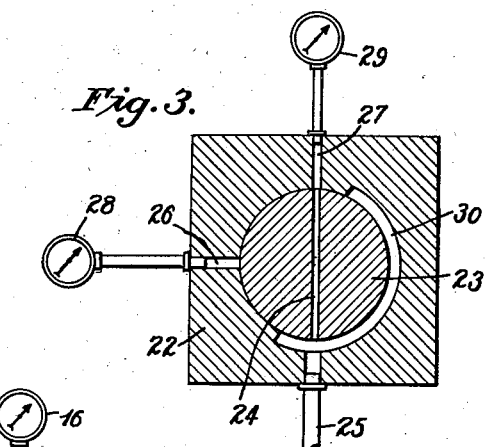
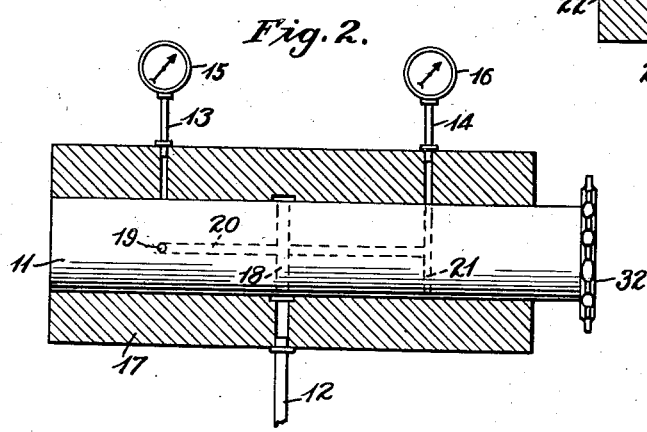
Inventor
Kurt Rathke
By Knight Bros.
Attorneys Patented Nov. 20, 1934

1,981,195

UNITED STATES PATENT OFFICE 1,981,195

DEVICE FOR THE INDICATION OF ALTERNATING PRESSURES

Kurt Rathke, Dusseldorf, Germany, assignor to Losenhausenwerk, Dusseldorf - Grafenberg, Germany Application July 31, 1931, Serial No. 554,366
In Germany September 22, 1930

2 Claims. (Cl. 265—14)

This invention relates to a pressure indicating device, and more particularly to one adapted to accurately indicate alternating pressures.

As a rule, the load indication by material testing machines or similar equipment takes place in three different manners that is, either by steelyard, by pendulum balance, or by hydraulic pressure gauge. However, every one of these three measuring devices fails under alternating loads, especially in the case of dynamic rapidly alternating loads. The first two devices mentioned get in such a state of strong vibration as to render absolutely impossible any indication; the index of the last device mentioned swings also far beyond the maximum or minimum load attained, thus, as well, rendering impossible any reading of the maximum or the minimum load, both of which are of utmost importance.

Therefore, attempts have been made to indicate the occurring maximum loads by embodying a check valve in the apparatus. By the actuation of such a valve, at every moment that the valve body strikes back at each impulse, it is impossible to avoid even the most trifling increase of volume. Because of the restrained compressibility of any liquid, this slight increase of volume effects a marked decrease in pressure, so that, especially in the case of rapid load alternations, the actual maximum pressure does not have the full effect on the measuring instruments. While such pressure gauges indicate an approximately constant pressure, the indications are actually not in conformity with the real maximum pressure in the machine. Minimum pressure gauges have been provided in the same way for such cases, where their check valves work in the contrary way. Of course, these minimum pressure gauges are guilty of the same defects as are the maximum pressure gauges.

On the other hand, an attempt has been made to obtain a certain maximum pressure under alternating loads, by providing an adjustable valve, which is calibrated, and which opens under a certain pressure. This kind of arrangement however has the disadvantage that, near the valve, the pressure falls off very much, while, on the other hand, the pressure in the working cylinder is liable to increase during a short time, so that, in this case as well, the actual maximum pressure cannot be adjusted or determined, all the more, as the difference of pressure in the working cylinder and around the valve depends upon the loading speed, and the number of alternations per unit of time.

According to the present invention all the disadvantages mentioned are eliminated. This arrangement is based upon the principle that a specially controlled part is accommodated between that portion of the machine where the load measurement takes place, for instance, the working cylinder, the measuring cylinder, or the hydraulic dynamometer, and the reading instrument, which allows the closing or the opening of the connection between the indicating device and that portion of the machine where the load is applied. If, for instance, it is desired that the maximum and the minimum load be indicated, this contrivance is arranged in such a way that the pressure gauge or similar device is in connection with the working cylinder at the moment the maximum pressure is attained in the latter, while this connection is cut off during the remaining time. Similarly, a second pressure gauge is in connection with the working cylinder at that moment only when a minimum pressure exists in the working cylinder. It is of special importance that these opening and closing actions cannot alter in any way the quantity of liquid contained in the pressure gauge. The liquid controlling device is actuated in the most favorable manner by the contrivance producing the alternate loading, for instance, by an eccentric or similar device, which produces, at the same time the movements of a pulsator piston or similar device.

In the drawing,

Fig. 1 is a schematic showing of my invention,

Fig. 2 is a central longitudinal sectional view of a detail of Fig. 1, and

Fig. 3 is a modification of Fig. 2 shown in a central vertical section.

In Fig. 1, the working cylinder is represented by 1, in which is moved forward and backward the piston 2 with the piston rod 3 by the pressure of the liquid. The piston rod 3 influences the specimen in a suitable way. A pulsator or similar means 4 is connected to the working cylinder by pipings 5. The alternating loads can be produced by the movements of the piston 6. Eccentric 9 drives the piston 6 by means of the piston rod 7 and the connecting rod 8. This eccentric drives, at the same time, by means of a back gear 32 with chain 33, or equivalent means, the liquid controlling device or distributor valve 10. The distributor valve 10 contains a rotary piston 11 which, during one rotation, produces a temporary connection between the piping 12 leading from the working cylinder, and the pipings 13 and 14 connected to the pressure gauges 15 and 16 respectively. The rotary piston 11 is controlled by the eccentric in such a way, that the controlling device gives free passage to the liquid at that moment when the pressure is desired to be read thus, for instance, always in the position of the pulsator piston corresponding to minimum or maximum pressures.

By way of example, the manner of opening and closing the passage for the liquid is shown in Fig. 2. 17 represents the casing of the controlling device 10, into which is finely fitted the rotary piston 11. The liquid coming from the working cylinder 1 passes through the tube 12 and fills all the bores 18, 19, 20, and 21, inside the rotary piston. Passages 19 and 21 are diametrically arranged in the piston 11 and are adapted to alternately register with tubes 13 and 14. In the position as drawn, the piping 12, and consequently the working cylinder 1, is in connection with the pressure gauge 16 through the piping 14, the opening of which fits exactly on the passage 21. The pressure existing during that time in the working cylinder is indicated by the pressure gauge. If the eccentric continues running, as well as the rotary piston, the flow of the liquid between the bores 14 and 21 is cut off, while the index of the pressure gauge remains in the same position until, after half a rotation of the rotary piston, the openings register again with each other, so that again the pressure gauge 16 is in connection with the working cylinder. Supposing that a maximum pressure exists at the position as shown in Fig. 2, and that when the rotary piston rotates by half a rotation of the eccentric, the minimum pressure will occur at that moment at which time the openings of 19 and 13 register with each other. Thus, the pressure gauge 16 will indicate always the occurring maximum pressure, while the pressure gauge 15 indicates the occurring minimum pressure. It is understood that the relation between the number of rotations of the driving eccentric and the rotary piston is not limited to the ratio of 2 to 1. The control device can be executed in different other ways as well.

An exceedingly simple case is represented by Fig. 3. Here, 22 represents the casing of the control device, in which a rotary piston 23 rotates. This rotary piston is provided with one single bore or passage 24 which, according to its rotation, will establish the connection on one hand, between the bore 25 suitably connected to the working cylinder, and on the other hand, with the bores 26 and 27 and consequently with the pressure gauges 28 and 29 respectively. Besides, the channel 30 has been provided so that the bore 24 is connected to the working cylinder at all times, so that, consequently, the pressure in this bore corresponds always to the actual pressure in the working cylinder.

Of course, the idea of the invention is not limited to material testing machines only. It can be used for any other equipment where any state of pressure is desired to be measured under fluctuating or alternating conditions.

Having described my invention, I claim:

1. In combination with a material testing machine having a pressure chamber, a liquid in said chamber, means including said chamber and said liquid for applying alternate loadings to a specimen under test, comprising driving means for imposing the alternate loadings upon the liquid in said chamber, a device for indicating the alternate loadings upon the liquid comprising a pressure gauge for indicating the maximum loading, a second pressure gauge for indicating the minimum loading, a communicating channel between said pressure chamber and said gauges, and a distributor valve in said channel actuated by said driving means for establishing communication between said pressure chamber and said first gauge only at the maximum loading limits imposed upon the tested specimen, and between said pressure chamber and said second gauge only at the minimum loading limits.

2. In combination with a material testing machine having a pressure chamber, a liquid in said chamber, means including said chamber and said liquid for applying alternate loadings to a specimen under test comprising driving means for imposing the alternate loadings upon the liquid in said chamber, a device for indicating the alternate loadings upon the liquid comprising a pressure gauge for indicating the maximum loading, a pressure gauge for indicating the minimum loading, a communicating channel between said pressure chamber and said gauges comprising a distributor valve including a hollow block having two outlet passages, one connected with each of said pressure gauges, an inlet passage in said block communicating with said pressure chamber, a cylinder with at least one passage therein rotatably mounted in said block, and means for rotating said cylinder by said driving means for registering communication between said pressure chamber and said gauges through said passages only at the maximum and minimum loading limits imposed upon the tested specimen.

KURT RATHKE.